United States Patent

[11] 3,575,033

| [72] | Inventor | Howard F. Meyer, Jr. |
| | | Northville, Mich. |
| [21] | Appl. No. | 807,230 |
| [22] | Filed | Mar. 14, 1969 |
| [45] | Patented | Apr. 13, 1971 |
| [73] | Assignee | Ford Motor Company |
| | | Dearborn, Mich. |

[54] TUBING BEADER
5 Claims, 4 Drawing Figs.

[52] U.S. Cl.......................................... 72/317,
72/318
[51] Int. Cl.................................... B21d 41/02
[50] Field of Search........................... 72/317,
318, (DLF Digest)

[56] References Cited
UNITED STATES PATENTS
3,415,100  12/1968  Britts........................... 72/317

| 2,447,909 | 8/1948 | Hunziker..................... | 72/318 |
| 2,370,089 | 2/1945 | Swyers........................ | 72/317 |
| 3,236,104 | 2/1966 | Pape............................ | 72/458 |
| 3,122,830 | 3/1964 | Dawson et al. ............. | 72/364 |

*Primary Examiner*—Charles W. Lanham
*Assistant Examiner*—Michael J. Keenan
*Attorneys*—John R. Faulkner and Glenn S. Arendsen ABSTRACT: A die member contains an annular passage that surrounds the exterior of a tube end and a guide pin that extends into the passage in the tube beyond the location of a desired bead. The tube is clamped into a holder at the approximate location of the bead and a force is applied to the die member to move the member toward the holder. This movement deforms the tube wall outward between the die member and the holder, thus forming a bead on the tube at a point remote from the tube end.

Patented April 13, 1971

INVENTOR
HOWARD F. MEYER, Jr.

BY John R. Faulkner
Glenn S. Arendsen
ATTORNEYS 3,575,033

TUBING BEADER

BACKGROUND OF THE INVENTION

Metal tubing is used in a wide variety of applications in both the automotive and aircraft industries for transmitting fluids and fluid pressures. The metal tubing usually must be fastened to components by threaded couplings that require flared ends or compression sleeves. Installations having vibration or relative motion generally use a length of metal tubing coupled to a length of flexible hose. Clamping the hose behind a raised bead on the tube produces an easily installed connection between the hose and the tube; forming such beads, however, has required relatively expensive equipment that is out of the reach of the ordinary repair station in the field.

SUMMARY OF THE INVENTION

This invention provides a mechanism and process for rapidly and efficiently producing a bead in a tube made of a deformable material at a location remote from the tube end. A relatively minor equipment investment is necessary to carry out the invention either in a production facility or in the field. The mechanism comprises a holder for engaging the tube at a distance remote from the tube end to prevent the tube from moving longitudinally. A die member fits on the tube end and surrounds the tube exterior for a longitudinal distance approximately equal to the length of tube desired between the bead and the tube end. A guide member, usually integral with the die member, extends into the tube passage beyond the location of the holder. Exerting a compressive force that moves the die member toward the holder deforms outward the portion of the tube wall between the upper surface of the holder and the lower surface of the die member to form a bead.

The cross-sectional shape of the bead varies according to the shapes of the facing surfaces of the holder and the die member. Beads projecting varying distances outward from the nominal tube diameter are produced by varying the length of tube between the facing surfaces of the holder and the die member. Bead position from the end of the tube is varied by varying the length of the die member.

A conventional flaring bar assembly of the type used to flare the ends of metal tubes can be used as the holder. Typically such flaring bar assemblies have chamfered openings on one side and flat openings on the other side; beads capable of producing joints having high axial tensile strengths are formed by deforming the tube wall against the flat opening.

DETAILED DESCRIPTION

Figure 1:
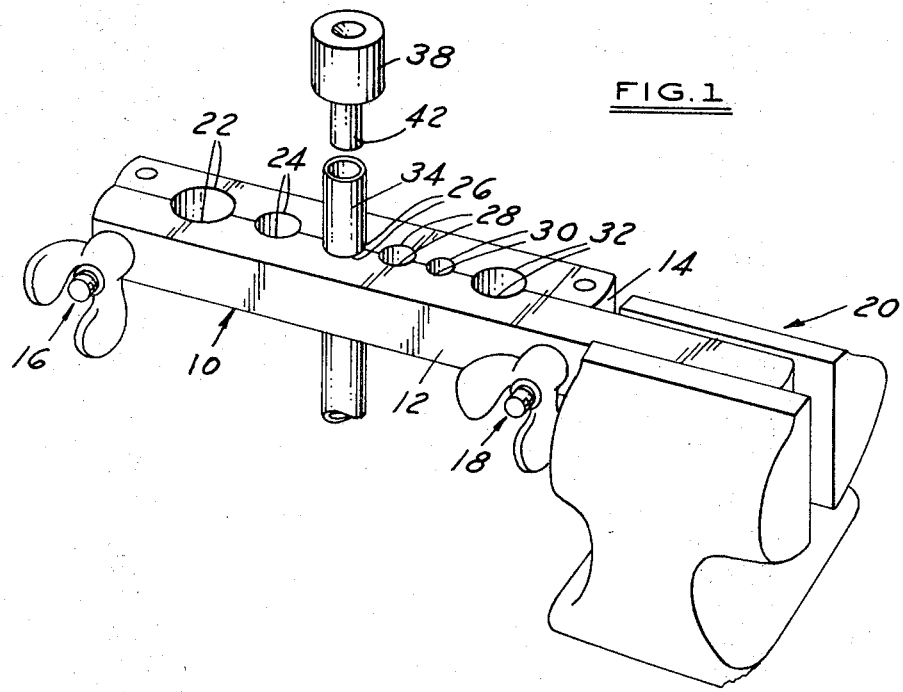
FIG. 1 is a perspective view showing a tube clamped in a flaring bar assembly with the die member positioned above the tube.
Figure 2:
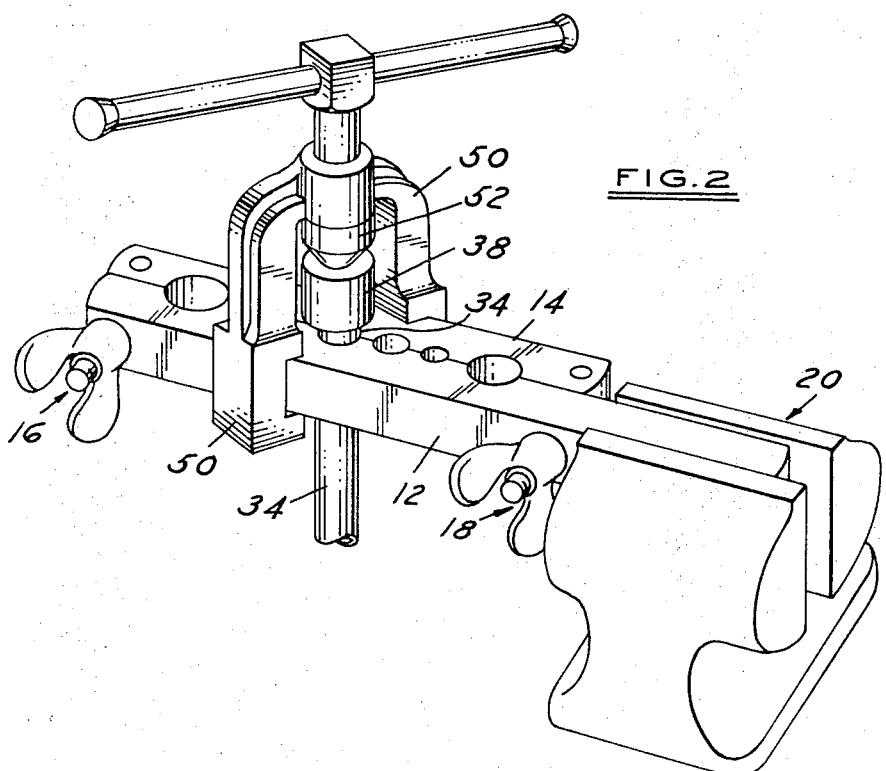
FIG. 2 shows a clamp assembly anchored on the flaring bars and positioned to exert a compressive force urging the die member toward the flaring bar.

Referring primarily to FIGS. 1 and 2, a conventional flaring a bar assembly of the type used to flare the ends of metal tubing is represented by numeral 10. Assembly 10 comprises a pair of bars 12 and 14 movable toward each other and capable of being locked against each other by threaded means 16 and 18. One end of bar 12 extends beyond threaded means 18 so the bar assembly can be clamped into a vise 20.

Figure 3:
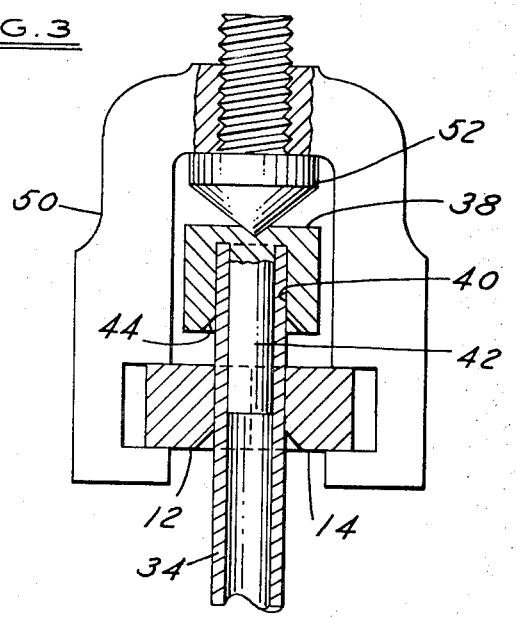
FIG. 3 is a sectional view showing the positions of the die member and tube before bead formation.

The contact surfaces of bars 12 and 14 contain a plurality of semicircular openings 22—32. Corresponding openings 22 have a similar size and shape and the other openings are smaller or larger to receive tubes of differing sizes. The openings are chamfered on one side and square on the other side (See FIG. 3). A tube 34 made of a permanently deformable material such as copper or mild steel is positioned in openings 26 with a length of the tube projecting above the square surface of bar assembly 10. The amount of projection is approximately equal to the length of tube desired above the intended bead location.

A die member 38 having an annular groove 40 (see FIGS. 3 and 4) corresponding in size and shape to tube 34 is fitted over the projecting end of the tube. Die member 38 includes a projecting guide 42 that fits into the passage of tube 34 and extends beyond the desired location of the bead. The exterior opening of groove 40 is chamfered about 45° as at numeral 44.

A conventional flaring yoke 50 then is fitted onto flaring bar assembly 10 with the threaded anvil 52 thereof bearing on the top of die member 38. Tightening anvil 52 exerts a compressive force on die member 38 that moves the die member toward flaring bar assembly 10. This movement deforms tube 34 downward in a manner such that the walls of tube 34 between die member 38 and the upper surface of bar assembly 10 expand outwardly into an annular bead 54 (See FIG. 4). Bead 54 slopes smoothly outward from the portion of tube 34 in the die member as defined by chamfer 44 and then turns sharply inward by virtue of the square nature of the upper surface of bar assembly 10.

The compressive force then is removed and die member 38 is withdrawn from tube 34. Threaded means 16 and 18 are loosened and the flaring bar assembly also is removed from tube 34. A rubber hose then can be inserted over the end of tube 34 with the hose extending beyond bead 54.

Figure 4:
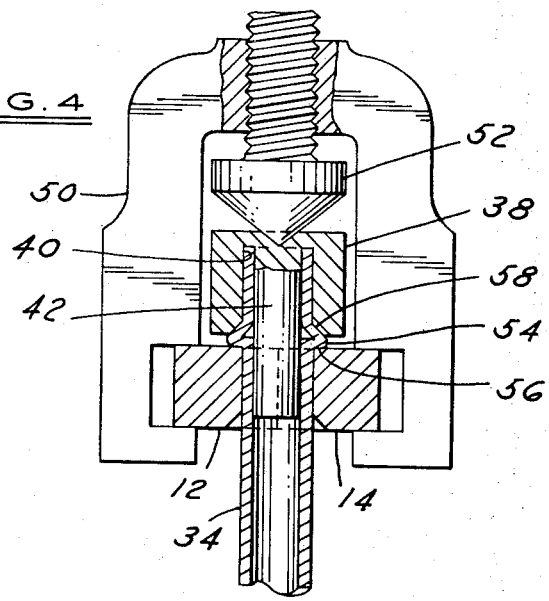
FIG. 4 is a sectional view similar to FIG. 3 but after bead formation.

A bead having the essentially perpendicular rear surface 56 shown in FIG. 4 increases considerably the axial tensile strength and pressure rating of the resulting hose-tube connection. The slope on the front surface 58 of the FIG. 4 bead facilitates installation of the hose onto the tube. Beads having an essentially symmetrical cross section can be produced by deforming the tube into the chamfered openings on the flaring bars 12 and 14. Such beads are useful particularly where frequent disassembly of the connection is required. Other bead shapes can be produced by modifying the shapes of the chamfers on the die member and the flaring bars.

A typical application of the bead is the return hoses for automotive power steering systems. Beads having a maximum diameter of one-half inch are formed in steel tubes having a nominal diameter of three-eighths inch. The bead is located at least about one-fourth—three-eighths inch from the tube end. Beads having the cross-sectional shape shown in FIG. 4 produce connections with a three-eighths I. D. hose exceeding 600 pounds of axial tensile force and about 200 p.s.i. of pressure.

Thus this invention provides a mechanism and a process for producing a bead in a metal tube at a location remote from the tube end. Bead shape can be varied readily to produce desired strength and assembly properties in a connection of the tube to an elastomeric hose. A relatively low capital investment permits the use of the invention by repair facilities in the field.

I claim:

1. A mechanism for producing a bead in a hollow tube made of a deformable material, said bead being located away from the tube end, said mechanism comprising:

holder means for engaging said tube at a distance remote from the tube end, said holder means preventing the tube from moving longitudinally;

die means having an annular groove fitting on the tube end and surrounding the tube exterior for a longitudinal distance approximately equal to the length of tube desired between the bead and the tube end, said die means having an integral guide member extending into the tube passage beyond the desired location of the bead; and compressing means for exerting a force moving said die means toward said holder means, said force deforming a portion of the wall of said tube into an externally projecting bead without changing significantly the shape of the tube portion between the bead and the tube end.

2. The mechanism of claim 1 in which the holder means comprises a pair of bars movable toward each other, the contact surfaces of said bars containing corresponding semicircular openings that close around a tube placed in the openings when the bars are moved toward each other.

3. The mechanism of claim 2 in which the surfaces of the bars on the side facing the die means are substantially square.

4. The mechanism of claim 3 in which the exterior edge of the annular groove in said die member is angled relative to the longitudinally axis of the tube.

5. The mechanism of claim 1 in which the surfaces of the bars on the side facing the die means are substantially square.